United States Patent
Wade (10) Patent No.: US 10,654,739 B2
(45) Date of Patent: May 19, 2020

(54) METHODS AND SYSTEMS FOR PROCESSING DREDGE SPOILS

(71) Applicant: Dredge Spoils Reclamation, LLC, Bellaire, TX (US)

(72) Inventor: Patrick D. Wade, Richwood, TX (US)

(73) Assignee: Dredge Spoils Reclamation, LLC, Richwood, TX (US)

( * ) Notice: Subject to any disclaimer, the term of this patent is extended or adjusted under 35 U.S.C. 154(b) by 528 days.

(21) Appl. No.: 14/832,591

(22) Filed: Aug. 21, 2015

(65) Prior Publication Data
US 2015/0353404 A1 Dec. 10, 2015

Related U.S. Application Data (63) Continuation of application No. 13/622,215, filed on Sep. 18, 2012, now abandoned.

(60) Provisional application No. 61/536,018, filed on Sep. 18, 2011.

(51) Int. Cl.
| | | |
|---|---|---|
| C02F 11/12 | (2019.01) | |
| C02F 11/121 | (2019.01) | |
| B09C 1/02 | (2006.01) | |
| B01D 25/12 | (2006.01) | |
| B09C 1/08 | (2006.01) | |
| C02F 11/122 | (2019.01) | |
| C02F 11/14 | (2019.01) | |
| C02F 101/30 | (2006.01) | |
| C02F 103/06 | (2006.01) | |
| C02F 101/10 | (2006.01) | |

(52) U.S. Cl.
CPC ............ *C02F 11/121* (2013.01); *B01D 25/12* (2013.01); *B09C 1/02* (2013.01); *B09C 1/08* (2013.01); *C02F 11/122* (2013.01); *C02F 11/14* (2013.01); *C02F 2101/10* (2013.01); *C02F 2101/30* (2013.01); *C02F 2103/06* (2013.01); *C02F 2201/008* (2013.01); *C02F 2209/05* (2013.01)

(58) Field of Classification Search
CPC ....... C02F 11/121; C02F 11/122; C02F 11/14; C02F 2101/10; C02F 2101/30; C02F 2103/06; C02F 2201/008; C02F 2209/05; B01D 25/12; B09C 1/02; B09C 1/08
See application file for complete search history.

(56) References Cited

U.S. PATENT DOCUMENTS

| | | | |
|---|---|---|---|
| 2003/0121863 A1* | 7/2003 | Kelly | B09C 1/02 210/721 |
| 2003/0230009 A1* | 12/2003 | Chesner | E02F 7/023 37/345 |

OTHER PUBLICATIONS

Port of Houston Authority, DAMP Sites FAQs, 2016, pags 1-5, available at http://www.portofhouston.com/inside-the-port-authority/channel-development/dredged-material-placement-areas-damp-sites/damp-sites-faqs/.

* cited by examiner

*Primary Examiner* — Carib A Oquendo (57) ABSTRACT

Methods and systems including processing dredge spoils to reclaim soil therefrom. The techniques may include a feed system for receiving dredge spoils, a dewatering system for removing water from the dredge spoils, and a grinder/mixer for grinding the dredge spoils from the dewatering system while mixing the dredge spoils with one or more additional materials.

20 Claims, 5 Drawing Sheets

METHODS AND SYSTEMS FOR PROCESSING DREDGE SPOILS

CROSS-REFERENCE TO RELATED APPLICATIONS

This application is a continuation of U.S. application Ser. No. 13/622,215 entitled "Methods and Systems for Processing Dredge Spoils," filed on Sep. 18, 2012, which claims priority to Provisional Application No. 61/536,018, entitled "Methods and Systems for Processing Dredge Spoils," filed on Sep. 18, 2011, the disclosure of which is incorporated herein by reference.

BACKGROUND

This invention relates to soils reclamation and, more specifically, in one or more embodiments, to methods and systems for processing dredge spoils to reclaim soil there from.

Dredging is the removal or displacement of material, such as gravel, sand, mud, silt, or other material and debris, from any body of water (e.g., stream, river, or lake), as well as from associated shorelines and wetlands. Dredging may be done for any of a variety of different reasons, including construction and maintenance of canals, navigation channels, turning basins, harbors, dikes, or marinas. Dredging also may be used for underwater mining activities. The material removed by dredging is commonly referred to as "dredge spoil." Dredge spoil disposal is the depositing of dredged materials onto land or into bodies of water for disposal or for the creation of new or additional lands for use. Drawbacks to current disposal techniques include limited availability of land and water suitable for containing the dredge spoils.

Consequently, there is a need for improved methods and systems for disposal of dredge spoils.

SUMMARY

One aspect of the invention relates to a system for processing dredge spoils, including: a feed system that receives dredge spoils; a dewatering system that removes water from the dredge spoils; and a grinder/mixer that grinds the dredge spoils from the dewatering system while mixing the dredge spoils with one or more additional materials to give a reclaimed soil product.

Another aspect of the invention relates to a method for processing dredge spoils, including: receiving dredge spoils to an inlet tank in a feed system; dewatering the dredge spoils to generate dewatered dredge spoils; and grinding the dewatered dredge spoils while mixing the dewatered dredge spoils with an additional material to give a reclaimed soil product.

Yet another aspect of the invention relates to a method for processing dredge spoils, including: receiving dredge spoils to a feed tank; agitating the dredge spoils in an agitation tank; dewatering the dredge spoils to generate dewatered dredge spoils; grinding the dewatered dredge spoils; and mixing an additional material with the dewatered dredge spoils.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

Advantages of the invention may become apparent upon reading the following detailed description and upon reference to the drawings in which.

DETAILED DESCRIPTION OF THE PREFERRED EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill in the art and having the benefit of this disclosure.

Figure 1:
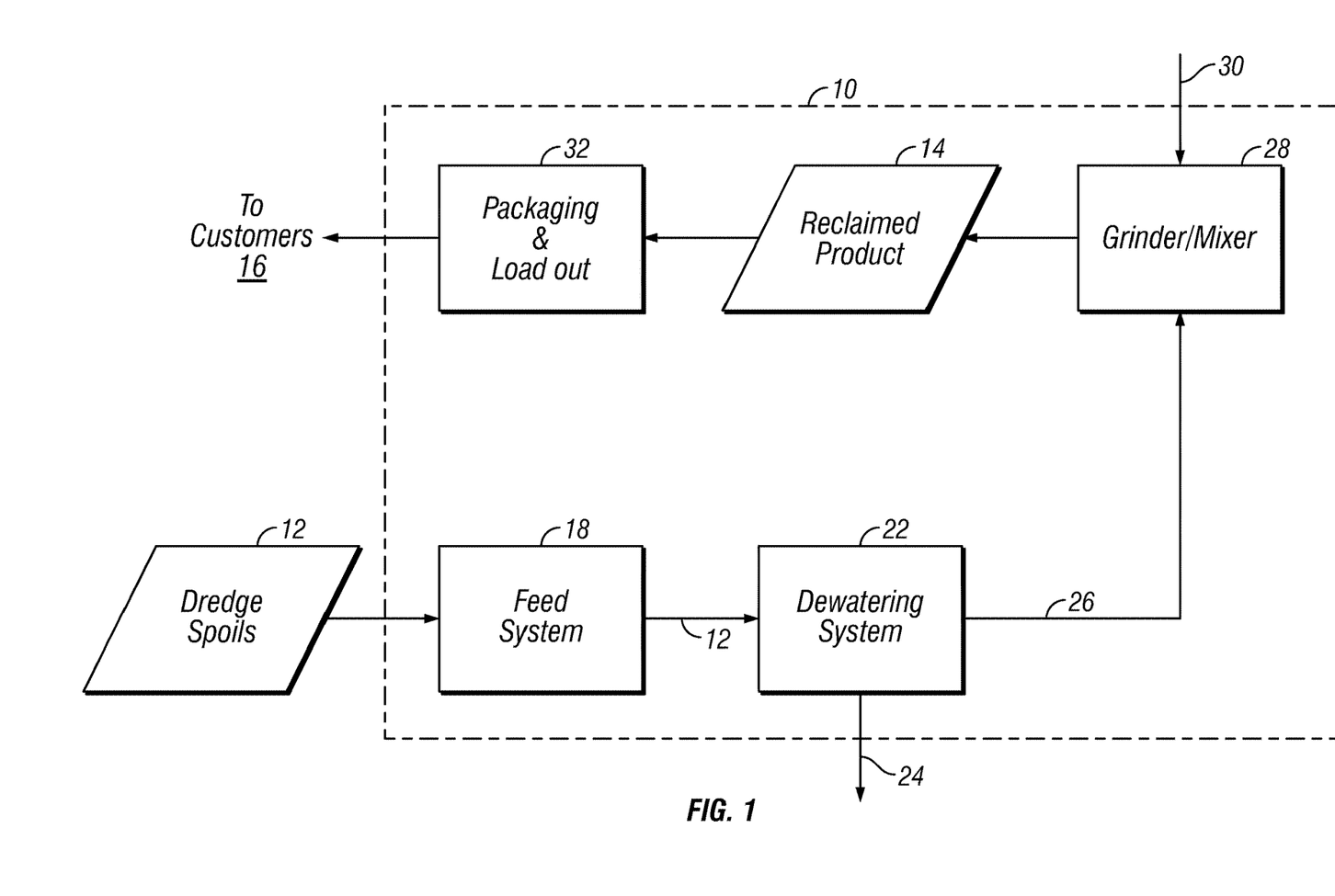
FIG. 1 is a block flow diagram of a soil reclamation system in accordance with one embodiment of the present techniques.

FIG. 1 illustrates an exemplary soil reclamation system 10 for processing dredge spoils. As discussed below, the system 10 depicted in FIG. 1 generally includes a feed system, a dewatering system, and a grinder/mixer. In the illustrated embodiment of FIG. 1, the reclamation system 10 receives dredge spoils 12 and generates a reclaimed soil product 14 that may be sent to customers 16. The system 10 may, for example, continuously process dredge spoils to produce reclaimed soil in accordance with embodiments of the present invention. In one embodiment, the system may process 2,000 tons per day of dredge spoils 12. It should be understood that the system may be scaled up or down, as desired for a particular application. Without limitation, the reclaimed soil may be sold to a local market, for example. The equipment used in this system may be skid mounted, in some embodiments.

The dredge spoils 12 may be any of a variety of different materials removed during a dredging operation, but typically include a mixture of sediment and water, for example. In one embodiment, the dredge spoils 12 may be directly fed by a dredge line from an ongoing dredging operation (see FIG. 4A). In another embodiment, the dredge spoils 12 may be re-hydrated dredge spoils supplied from a storage location (see FIG. 4B as an example). Without limitation, use of dredge spoils 12 from a storage location (not shown) may allow reclamation of land which can then be used for future storage and/or handling system expansion.

The dredge spoils 12 are received at a feed system 18 that may store and, in certain examples, treat the dredge spoils 12. The feed system 18 may pump or otherwise transport the dredge spoils 12 to further processing in system 10. The feed system 18 may include a variety of different inlet equipment including, for example, inlet tanks, filtration equipment, sampling equipment to determine material composition and/or other properties, chemical injection equipment for treating the dredge spoils to, for example, neutralize any undesirable elements, pumping equipment, and mixing equipment. The dredge spoils 12 discharging from the feed system 18 may be identical to the dredge spoils 12 received, or may be dredge spoils 12 that have been chemically-treated in the feed system 18, for example.

The dredge spoils 12 from the feed system 18 may be fed to the dewatering system 22 for dewatering of the dredge spoils 12. The dewatering may be accomplished using various techniques. For example, one or more filter presses may be used in series or parallel to treat the dredge spoils for water removal. The water removed from the dredge spoils may be disposed or returned to a water source, such as a body of water being subjected to dredging, for instance. In an embodiment, the water may be returned to the body of water from which the dredge spoils were removed.

The dewatered dredge spoils 26 may be fed to a grinder/mixer system 28. The grinder/mixer 28 may grind the dewatered dredge spoils 26 while mixing them with additional materials 30 fed to the grinder/mixer 28. The grinding and mixing may be accomplished using any suitable method, including a pug mill, for example. In an embodiment, the additional materials 30 fed to the grinder/mixer 28 include one or more of sand or processed sewage.

The grinder/mixer 28 may output reclaimed soil in a reclaimed product 14. For example, the grinder/mixer 28 may grind the dewatered dredge spoils with the additional material to produce, for example, general fill, structural fill, topsoil, compost, and/or bedding soil as the reclaimed product 14. The output or reclaimed product 14 from the grinder/mixer 28 may be fed to a packaging and load out system 32 which may include equipment for packaging (e.g., bagging) and bulk handling of the reclaimed soil product 14, for load out to rail car or truck for delivery to the customers 16.

Figure 2:
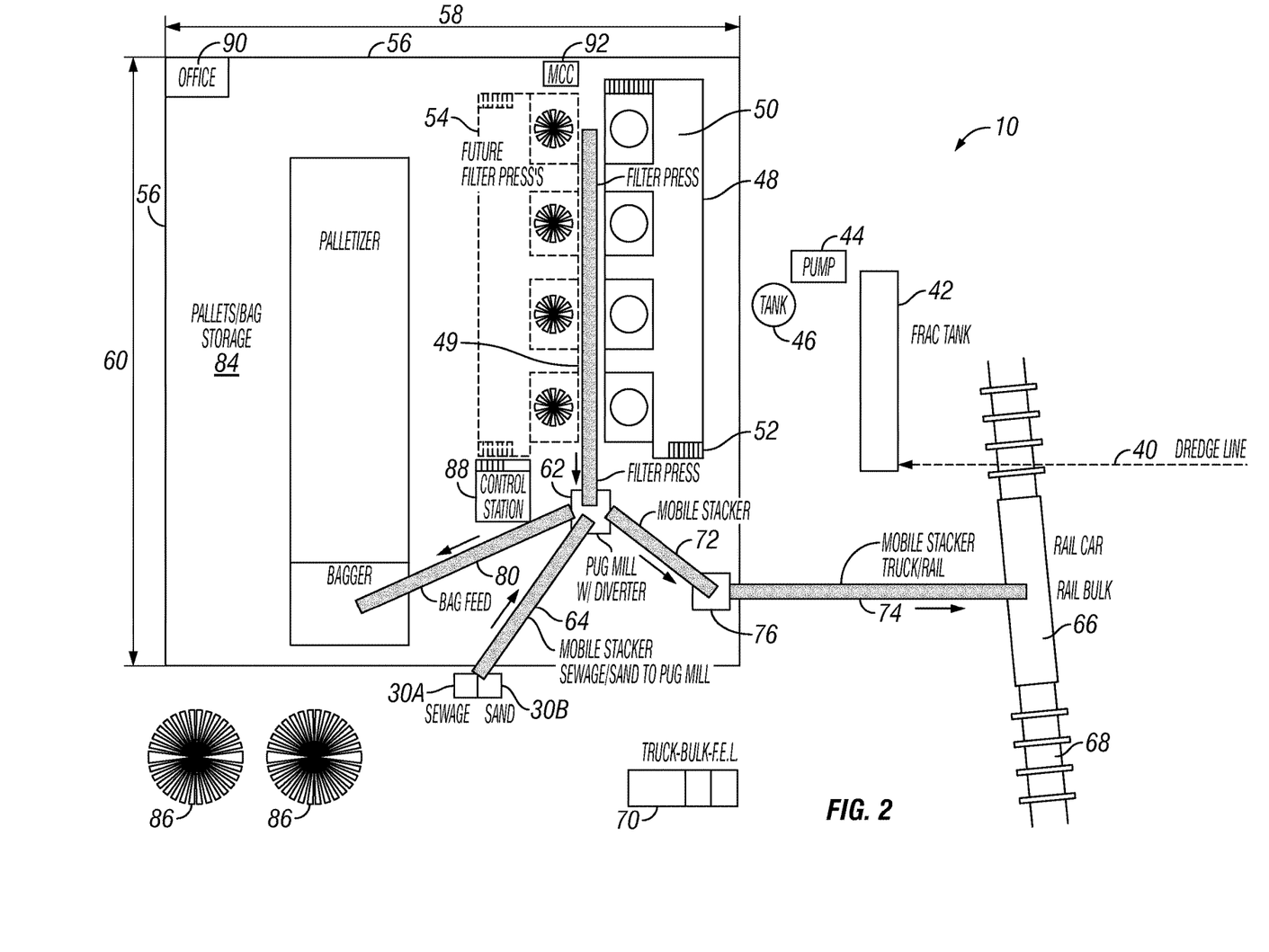
FIG. 2 is a diagrammatical representation of an equipment layout of a soil reclamation in accordance with one embodiment of the present techniques.

FIG. 2 illustrates an exemplary layout or plot plan of some equipment of a soil reclamation system 10 for processing dredge spoils 12. At the outset, it should be emphasized that the depicted layout of the equipment is only exemplary to explain a particular example and not meant to limit the present invention. Indeed, the arrangement, scale, indicated distances, and so forth, are merely given for the benefit of the skill artisan in understanding a specific embodiment of the present techniques. Further, the types/amount of equipment employed in system 10 for processing dredge spoils may be different in other embodiments.

As discussed, the system 10 may continuously (or in a batch fashion) process dredge spoils 12 to produce reclaimed soil including reclaimed soil product 14 in certain embodiments. Again, the dredge spoils 12 may be any of a variety of different materials removed during a dredging operation, but typically include a mixture of sediment and water, for example. In one embodiment, the dredge spoils 12 may be directly fed to the system by a dredge line from an ongoing dredging operation. In another embodiment, the dredge spoils 12 may be re-hydrated dredge spoils supplied to the system from a storage location.

As illustrated, the system 10 may include an inlet tank 42 (feed tank) to which the dredge spoils 12 may be provided. Without limitation, the inlet tank 42 may be used to provide circulation capacity, residence time, storage, hold-up, and so forth, for the process. Any suitable tank for handling the dredge spoils may be used. In one embodiment, the inlet tank 42 may be an oilfield fractionation tank, commonly referred to as a "frac tank." In one embodiment, the inlet tank 42 may have a capacity of about 500 barrels (22,000 gallons). In some embodiments (not illustrated), filtration equipment may be located prior to the inlet tank 42 to screen out larger materials, such as rubbish, chains, tires, etc., from the dredge spoils. Any suitable equipment may be used for filtration. In an embodiment, a grizzly-type screen may be used for the filtration.

In some embodiments, a sampling device may be coupled to the inlet tank 42 for sampling the dredge spoils 12 contained therein. The sampling device may be used to, for example, determine the material composition of the dredge spoils in the inlet tank. In one embodiment, the sampling device may continuously sample the dredge spoils from the inlet tank. In some embodiments, a chemical injection device may also be coupled to the inlet tank. The chemical injection device may be used to, for example, inject chemicals into the inlet tank 42 for neutralization of any undesirable elements in the dredge spoils. In an embodiment, the chemicals may be injected in response to the material composition determined by the sampling device.

In some embodiments, dredge spoils 12 from the inlet tank may be fed via a pump 44 to an agitation tank 46. In one embodiment, the pump 44 may be a 125-horsepower pump. The pump 44 may also be a duplex pump, for example. The pump 44 may be configured with recirculation back to the inlet tank 42, for example. In one embodiment, the agitation tank 46 may have a capacity of about 90 barrels (4,000 gallons). The piping feed system for the agitation tank 46 may include, for example, a dilution water valve, densometer, densitometer, or other equipment.

In some embodiments, dredge spoils from the agitation tank 46 may be fed to filter presses 48 via one or more pumps (not shown). In one embodiment, the four 600 gallon per minute pumps may be used to feed the dredge spoils from the agitation tank 46 to the filter presses 48. The filter presses 48 may dewater the dredge spoils 46. The filter presses 48 may include any of a variety of different filter presses suitable for dewatering the dredge spoils. In one embodiment, the filter presses 46 may include four 15 dry ton per hour filter presses.

In certain embodiments, an elevated platform 50 may be constructed around the filter presses 48 and/or part of a support structure of the filter presses 48, to facilitate access to the filter presses 48. One or more ladders 52 may be incorporated as part of the platform 50. Moreover, an area 54 may be designated for possible expansion to add more filter presses. In the illustrated embodiment, the area 54 corresponds to a potential another train of four filter presses and associated platform for possible addition. The entire process is scalable.

In some examples, a central footprint 56 (e.g., an inside battery limit or other characterization as understood by the skilled artisan) may be designated or realized. The various equipment of the system 10 may be arranged within or outside the central footprint 56, depending on construction, operating, and/or maintenance needs, for instance, and whether mobile or stationary, and so on. In the illustrated embodiment, the central footprint 56 has a width dimension 58 and a length dimension 60. Of course, other geometries may be realized or employed. In the illustrated example, the width 58 is 125 feet and the length 60 is 130 feet.

In some embodiments, the filter presses 48 may be arranged in series and discharge to a conveyor 49 operating toward a grinder/mixer 62. The dewatered dredge spoils 26 (FIG. 1) from the filter presses 48 may be fed to grinder/mixer 62 (e.g., a pug mill in the grinder/mixer system 28 of FIG. 1) via the conveyor 49. Any suitable conveyor may be used for feeding the grinder/mixer 62 or pug mill, including mobile conveyors. In an embodiment, the conveyor 49 may be an 80 foot by 36 inch conveyor having a 70 ton per hour capacity.

The grinder/mixer 62 (e.g., a pug mill) may grind the dewatered dredge spoils 26 (FIG. 1) while mixing them with additional materials fed to the grinder/mixer 62 to produce, for example, topsoil, compost, bedding soil, and/or structural fill as reclaimed product 14. As illustrated, the grinder/mixer 62 or pug mill may be fed additional materials 30 (FIG. 1), such as sand 30A and processed sewage 30B (and/or other organic additives) from a storage holding location, mobile vehicle, or mobile container, and so forth (at the boundary of the central footprint 54 in the illustrated example).

The type and amount of additional materials 30 stored and added to the grinder/mixer 62 may be based on a number of requirements, including, for example, the desired reclaimed soil product 14 to be produced by the system. In certain embodiments one or more conveyers 64 (e.g., conveyer belt, mobile stacker, module stacker, etc.) may feed the sand 30A and processed sewage 30B (and/or other organic additives) to the grinder mixer 28. In one embodiment, a single 44 foot by 36 inch mobile conveyor 64 having a 70 ton per hour capacity may be used to feed the sand 30A and processed sewage 30B to the grinder/mixer 62. Of course, other sources and techniques for feeding sand, processes sewage, and/or other organic additives may be employed. Moreover, in one embodiment, the dewatered dredge spoils 26 may be mixed in the grinder/mixer 62 in about a 1:1 ratio with sand.

In some embodiments, reclaimed soil (e.g., reclaimed soil product 14 of FIG. 1) from the grinder/mixer 62 (e.g., pug mill in a grinder/mixer system 28 of FIG. 1) is loaded out to a rail car 66 situated on a rail track 68 for bulk distribution to customers 16. (FIG. 1). The product 14 may also be loaded to a truck 70 for bulk distribution, for example.

In the illustrated embodiment, two conveyors 72 and 74 meeting at a junction 76 deliver the product 14 to the rail car 66 or truck 70. The conveyors 72 and 74 may each be a mobile stacker, module stacker, a mobile or a fixed conveyor belt, and the like. In one embodiment, the conveyor 72 may be a 28 foot by 36 inch module stacker having a capacity of about 70 tons per hour. In one embodiment, the conveyor 74 may be a 60 foot by 36 inch mobile stacker having a capacity of 70 tons per hour. In some embodiments, the grinder/mixer 62 may have a diverter section to facilitate that the grinder/mixer 62 can discharge to conveyors 72 and 74 for loading the rail car 66 or truck 70.

In some embodiments, the reclaimed soil product 14 may also be delivered to bagging equipment 78 via a conveyor 80, and the bags filled with the reclaimed soil product 14 stacked on palletizers by palletizing equipment 82, for example. The conveyer 80 may be a mobile stacker, module stacker, a mobile or fixed conveyer belts, and the like. In one embodiment, the conveyor 80 may be a 50 foot by 36 inch fixed conveyor. Moreover, in certain embodiments, the conveyer 80 may be used to convey the reclaimed soil product 14 from the grinder/mixer 62 to a hopper on top of the bagging equipment 78, for example.

Any suitable equipment may be used for bagging the reclaimed soil. In one embodiment, the bagging equipment 78 may have a capacity of about 4 to about 11 bags per minute. It should be understood that the capacity of the bagging equipment 78 may be based on a number of factors, including, for example, market requirements. At 4 bags per minute, pallets can be loaded and plastic wrapped manually, for example. At 11 bags per minute, a semi-automatic palletizer/wrapper can be used to satisfy the bagging rate. The filled bags and/or pallets of the filled bags may be situated in pallets/bags storage area 84. Moreover, empty bags and pallets may be stored in the area 82 and available for use by the bagging equipment 78 and palletizer 82, for instance.

Lastly, as appreciated by one of ordinary skill in the art, the facility (site) and/or the soil reclamation system 10 may have one or more storage tanks 86 (for feeds or products) or potential storage tanks 86, a control station 88, an office 90, and a motor control center (MCC) 92. The control station 86 may include a computer or programmable logic controller (PLC), for example, and used to facilitate control of the filter presses 48, grinder/mixer 62, bagging equipment 78 and palletizing equipment 82, conveyors, bulk load out, and associated equipment and other systems such as in the upstream feed system, and so forth. The MCC 92 may facilitate electrical supply to and control of motors at the site, such as motors associated with pumps, agitation tank 46 filter presses 48, grinder/mixer 62, and other equipment.

Figure 3:
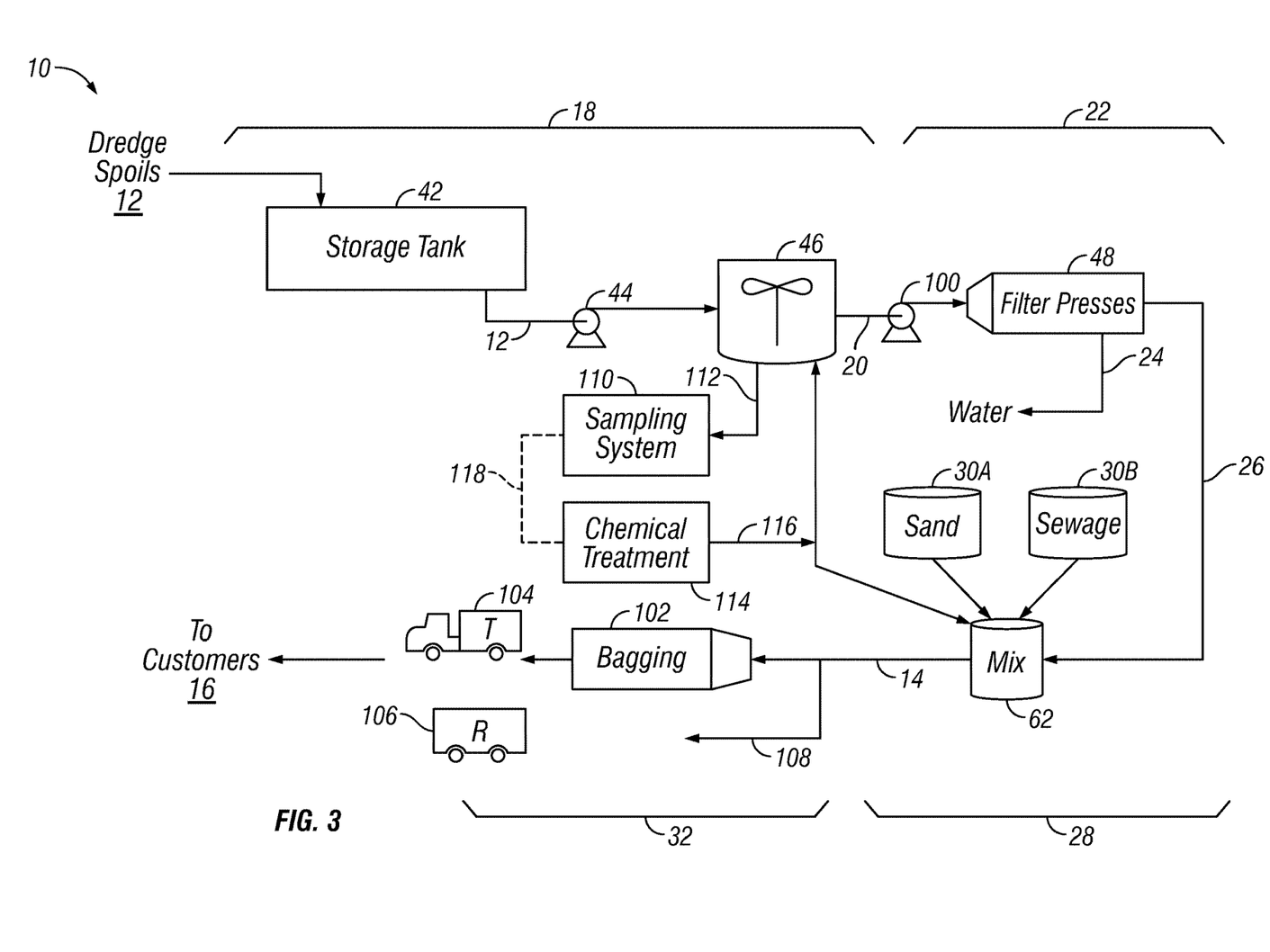
FIG. 3 is a process flow diagram of the soil reclamation system in accordance with one embodiment of the present techniques.

FIG. 3 is a process flow diagram of an exemplary soil reclamation system 10. At the outset, it should be noted that exemplary capacities of the storage, processing, unit operations, conveying, bagging, and so on, previously discussed with regard to FIGS. 1 and 2 may apply to FIG. 3. As shown in FIG. 3, the dredge spoils 12 are received at a storage tank 42 (e.g., feed tank, inlet tank, surge tank, etc.). The feed system 18 having the storage tank 42 may provide a beneficial interface between the source of dredge spoils source and the further treatment in the soil reclamation system 10. Indeed, employment of the feed system 18 may make feasible the receipt and disclosed processing of the dredge spoils in certain examples.

As discussed, the dredge spoils 12 may be obtained from an active dredging operation and/or from a Dredge Material Placement Area (DMPA). In the case of obtaining the dredge spoils 12 from the DMPA, the dredge spoil collected from the DMPA may be hydrated with water prior to providing the dredge spoils 12 to the storage tank 42.

As indicated, the storage tank may be a frac tank, for example, such as a frac tank employed to hold water or proppants in oil field applications. In certain examples, the storage tank 42 may be mobile or portable. Indeed, it may be beneficial to situate the storage tank near an ongoing dredging operation or adjacent to a particular portion of a DMPA, for instance. In certain operations, the storage tank 42 may operate with a relatively short residence time as a feed tank instead of as long-term storage.

Further, the dredge spoils 12 in the storage tank 42 may be sampled and tested for material composition. Also, the dredge spoils 12 in the storage tank 42 may be chemically treated to neutralize or remove undesirable components, for example. Such treatment may be in response to the testing (testing results) of the dredge spoils 12 sampled from the storage tank 42.

In the illustrated embodiment of FIG. 3, the dredge spoils 12 (whether untreated or treated with chemical addition) are fed via a pump 44 from the storage tank 42 to an agitation tank 46. The agitation tank 46 stirs or agitates the dredge spoils 12 to provide for more homogeneity of the dredge spoils 12, for example. As discussed below, the dredge spoils 12 in the agitation tank 46 may be sampled and tested, and/or chemically-treated. Moreover, it should be noted that the in certain embodiments, the storage tank 42 is mobile and the agitation tank 46 is stationary. Of course, other configurations are contemplated. Moreover, in alternate embodiments, the storage tank 42 and agitation tank 46 may be combined into a single vessel or single unit operation.

The dredge spoils 20 discharging from the agitation tank 46 are fed via a pump 100 to a filter press 48 (i.e., a train of filter presses). The water 24 removed from the dredge spoils via the filter press 48 may be disposed. On the other hand, the water 24 may be recycled to an upstream body of water undergoing the dredging operation, or used to hydrate dredge spoils collected from a DMPA, and so on. The operation of the filter presses 48 may be batch, semi-continuous, or continuous, as appreciated by the skilled artisan.

The dewatered dredge spoils 26 discharging from the filter presses 48, and which may still contain some moisture, are fed to a grinder/mixer 62. As discussed, the grinder/mixer 62 may grind the dewatered dredge spoils 26 while mixing them with additional materials 30 fed to the grinder/mixer 28. In one example, the grinder/mixer 62 is a plug mill. In an embodiment, the additional materials 30 fed to the grinder/mixer 62 include sand 30A and/or processed sewage 30B. The grinder/mixer 62 may output reclaimed soil in a reclaimed soil product 14. For example, the grinder/mixer 62 grinding of the dewatered dredge spoils 26 with the additional material 30 produces, for example, the output reclaimed soil product 14 may be topsoil, compost, and/or bedding soil, and the like.

The output or reclaimed product 14 from the grinder/mixer 62 may be fed to a bagging system 102 where bags are filled with the product 14. The bags filled with the reclaimed soil product 14 may loaded (e.g., on pallets) into a truck 104 or rail car 106, and sent to customers 16. Further, the reclaimed product 14 may bypass 108 the bagging system 102, and be loaded in bulk into the truck 104 and railcar 106 for delivery to the customers 16. It should be noted that the bagging system 102, truck 104, and railcar 106 in FIG. 3 may generally correspond to similar elements depicted in FIG. 2 in certain examples A sampling system 110 may be included in the soil reclamation system 10. The sampling system 110 may include piping, valves, containers, cylinders, and small vessels, etc. to provide for manual sampling and/or online sampling of dredge spoils throughout the soil reclamation system 110. As depicted by the reference numeral 112 in the illustrated embodiment of FIG. 3, a sample point may include the agitation tank 46. Of course, dredge spoils may be sampled at other points or locations in the soil reclamation system 10, such as at the storage tank 42, filter presses 48, grinder/mixer 62, and so on. In one embodiment, the reclaimed soil product 14 is sampled at the discharge of the grinder/mixer 62. The reclaimed product 14 may also be sampled further downstream, such as in the packaging and load out area including as at a feed hopper to the bagging operation, for example, or in the bulk loading of a rail car or truck, for instance, and so on. Indeed, the final product 14 may be sampled (and tested).

The dredge spoils sampled at the various locations in reclamation system 10 may be tested for undesirable components, desirable quality, density, average particle size, particle size distribution, water, moisture, and so forth. Undesirable components may include organics, inorganics, salt, hydrocarbons, etc. The testing for quality, various undesirable components, and other properties may involve analyzing samples (e.g., collected manually) in a laboratory, such as at an on-site laboratory or a remote laboratory. The testing may also include on-line analysis with on-line instrumentation. Indeed, as indicated, the sampling system 110 may include on-line sampling features and on-line analytical instrumentation, as appreciated by the skilled artisan.

The reclaimed soil system 10 may also include a chemical treatment system 114. In the illustrated embodiment, chemical injection 116 is provided to the agitation tank 46 and grinder/mixer 62. Chemical injection may also be provided at other points in the soil reclamation system 10, such as to the storage tank 42, at inlet piping of dredge spoils to the storage tank 42, or other piping/pumping in the reclamation system 10, and so on. The chemical injection may be in response to the sampling and testing performed, as indicated by reference numeral 118. It should be noted that a desalination operation of the dredge spoils may be implemented.

Figure 4A:
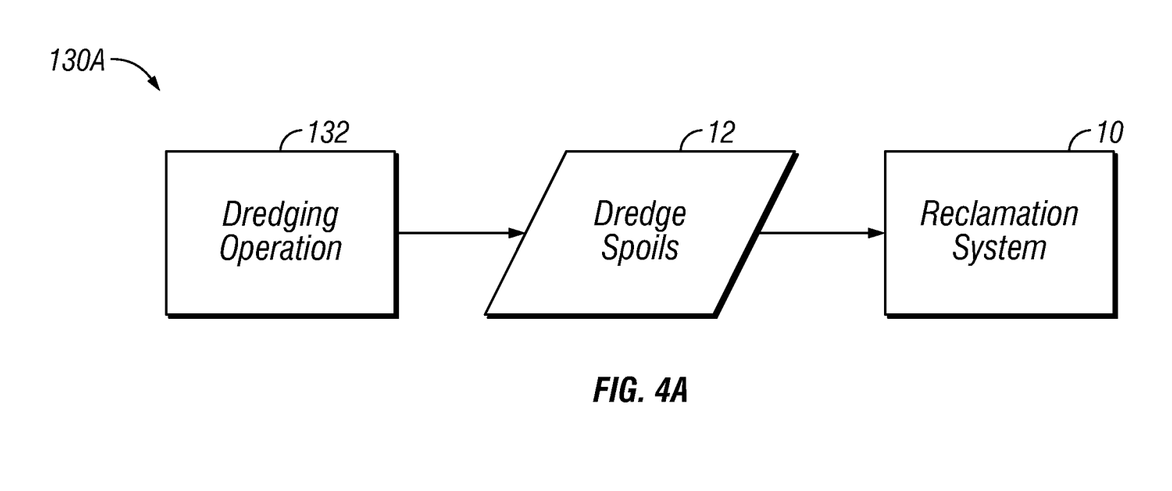
FIG. 4A is a block flow diagram depicting a source of dredge spoils to a soil reclamation system in accordance with one embodiment of the present techniques.
Figure 4B:
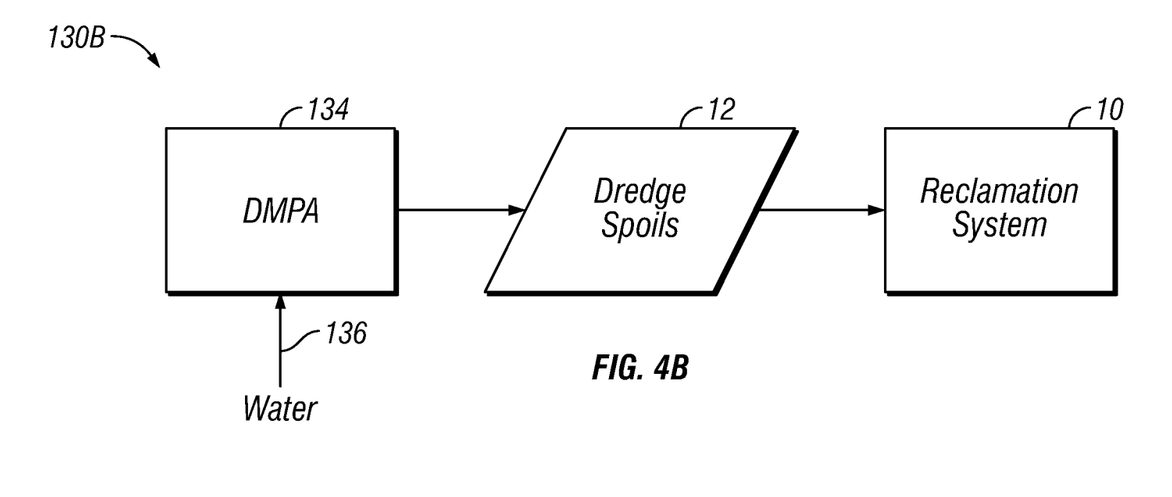
FIG. 4B is a block flow diagram depicting another source of dredge spoils to a soil reclamation system in accordance with one embodiment of the present techniques.

Referring now to FIGS. 4A and 4B. FIG. 4A depicts a dredge spoil supply and treatment system 130A. In this embodiment, a dredging operation 132 is a source of the dredge spoils 12 provided to the feed system of the reclamation system 10. In an alternate embodiment, FIG. 4B depicts a dredge spoil supply and treatment system 130B in which a DMPA 134 is a source of the dredge spoils 12 provided to the soil reclamation system 10. In the illustrated embodiment of FIG. 4B, water 136 is added to hydrate the dredge spoils obtained from the DMPA 134 to provide dredge spoils 12 as hydrated for delivery to and use by the feed system in the reclamation system 10. The source of the water 136 may be recycled water from the soil reclamation system 10, water from a local body of water, or merely potable or industrial water, and so on.

Figure 5:
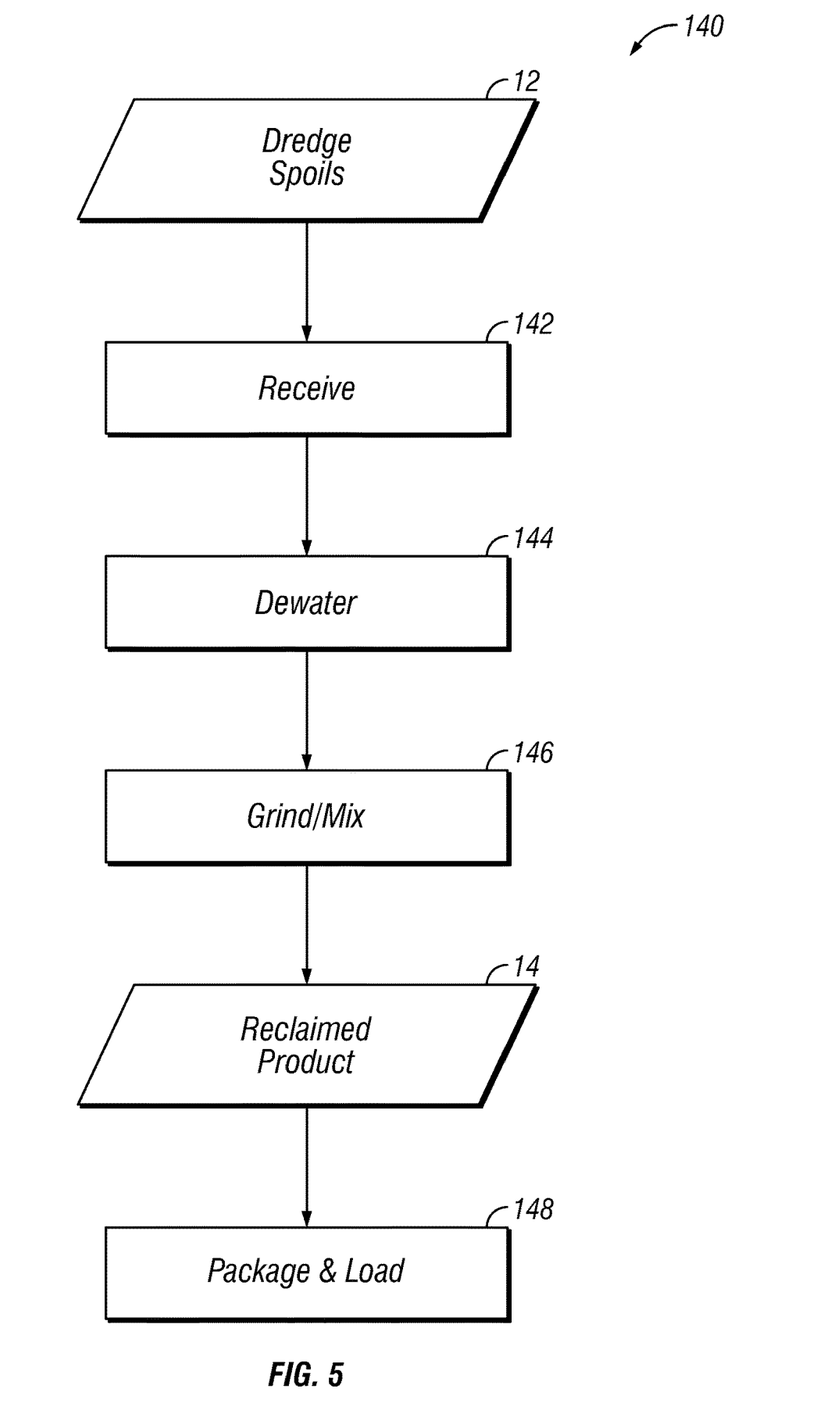
FIG. 5 is a block flow diagram of a method of reclaiming soil from dredge spoils in accordance with one embodiment of the present techniques.

FIG. 5 is an exemplary method 140 of reclaiming soil from dredge spoils 12 to produce a reclaimed soil product 14. Initially, the dredge spoils 12 are received (block 142) at a feed system 18 of a reclamation system 10 (FIGS. 1-3). As discussed, the dredge spoils 12 may be received directly from a dredging operation, or from a DMPA, for example. The dredge spoils 12 are dewatered (block 144), such as in filter presses and/or with other unit operations or equipment. The dewatered dredge spoils 28 are subjected to grinding/mixing, as depicted by reference numeral 146. In certain embodiments, the dewatered dredge spoils 28 may be subjected to grinding while mixed with one or more additional materials 30 (e.g., sand, processed sewage, etc.). In a particular example, such grinding/mixing is performed in a pug mill. The output of the grinding/mixing (block 146) may be the reclaimed soil product 14. Lastly, the reclaimed soil product 14 may be packaged and/or loaded, and noted in block 148, and shipped to customers 16. The reclaimed soil product 14 may be packaged in bags, drums, box containers, and so forth. Such packaging may be loaded out onto rail cars, trucks, etc. for delivery to customers 16. Moreover, the reclaimed soil product 14 may be loaded in bulk without packaging to rail cars or trucks, etc., for delivery to customers 16. The packaging and loading of the reclaimed soil product 14 (e.g., topsoil, compost, bedding soil, etc.) may involve storage and bulk handling of the product 14, including the equipment operations discussed with regard to FIGS. 1-3, for example.

The construction of a process facility that includes the soil reclamation system 10 in accordance with embodiments of the present invention may incorporate hazards mitigation with regards to storm surges up to 20 or more feet, which includes storm surges associated with a Category 4 hurricane. Hazards mitigation may consider all primary mechanical, electrical, and/or instrumentation components. In some embodiments, the process facility may be constructed to withstand a wind load of 140 miles per hour.

In summary, the present techniques provide for a system (e.g., a soil reclamation system) for processing dredge spoils, including a feed system that receives dredge spoils, a dewatering system (e.g., including filter presses) that removes water from the dredge spoils, and a grinder/mixer (e.g., pug mill) that grinds the dredge spoils from the dewatering system while mixing the dredge spoils with one or more additional materials to give a reclaimed soil product. The feed system may include a feed tank (e.g., frac tank) that receives the dredge spoils from a dredging operation and/or from a DMPA. Further, the feed system may include an agitation tank that mixes the dredge spoils from the feed tank. The soil reclamation system may include a sampling system configured to sample or facilitate sampling of the dredge spoils from the agitation tank or at other locations, and a chemical treatment system that injects a chemical into the dredge spoils in the agitation tank or at other locations. Lastly, the soil reclamation system may include a bagging system to bag the reclaimed soil product (e.g., topsoil, compost, and/or bedding soil, etc.), and a solids conveyer to transport the reclaimed soil product from the grinder/mixer to the bagging system.

The present techniques provide for a method for processing dredge spoils, including receiving dredge spoils to an inlet tank (feed or storage tank) in a feed system (e.g., from a dredging operation and/or from a DMPA). The method may include hydrating the dredge spoils from the DMPA prior to receiving the dredge spoils at the inlet tank. The method may include dewatering the dredge spoils (e.g., via filter presses) to generate dewatered dredge spoils, and grinding the dewatered dredge spoils while mixing the dewatered dredge spoils with an additional material (e.g., sand, processed sewage, etc.) to give a reclaimed soil product. The method includes agitating the dredge spoils in the feed system, sampling and/or chemically treating the dredge spoils in the feed system or other locations. The method may also include transporting water removed from the dredge spoils in the dewatering to a water body undergoing a dredging operation.

Although the present invention and its advantages have been described in detail, it should be understood that various changes, substitutions and alterations may be made herein without departing from the spirit and scope of the invention as defined by the appended claims. Although individual embodiments are discussed herein, the invention covers all combinations of all those embodiments.

What is claimed is:

1. A method for processing dredge spoils, comprising:
    filtering dredge spoils in filtration equipment;
    receiving dredge spoils from the filtration equipment in a land based mobile feed tank;
    pumping the dredge spoils from the land based mobile feed tank to an agitation tank;
    agitating the dredge spoils in the agitation tank;
    pumping the dredge spoils from the agitation tank to a dewatering system, wherein the dredge spoils are dewatered to generate dewatered dredge spoils;
    grinding the dewatered dredge spoils in a grinder; and
    mixing an additional material with the dewatered dredge spoils to produce a reclaimed soil selected from a group consisting of topsoil, compost, and bedding soil, wherein the additional material comprises sand and an organic additive.

2. The method of claim 1, further comprising sampling the dewatered dredge spoils and treating the dewatered dredge spoils at multiple locations.

3. The method of claim 1, comprising agitating the dredge spoils in the land based mobile feed tank.

4. The method of claim 1, comprising sampling and/or chemically treating the dredge spoils in the agitation tank and the grinder.

5. The method of claim 1, wherein the dredge spoils are dewatered with at least three filter presses, and wherein the filtration equipment comprises a grizzly-type screen.

6. The method of claim 1, comprising transporting water removed from the dredge spoils in the dewatering system to a water body undergoing a dredging operation.

7. A method for processing dredge spoils, comprising:
    hydrating the dredge spoils from a dredge material placement area, wherein the dredge spoils are not received from an active dredging operation;
    receiving the dredge spoils in a land based mobile feed tank in a feed system;
    pumping the dredge spoils from the land based mobile feed tank to an agitation tank;
    agitating the dredge spoils in the agitation tank;
    pumping the dredge spoils from the agitation tank to a dewatering system, wherein the dredge spoils are dewatered to generate dewatered dredge spoils; and
    grinding the dewatered dredge spoils in a grinder while mixing the dewatered dredge spoils with an additional material to give a reclaimed soil, wherein the additional material comprises sand and an organic additive.

8. The method of claim 7, wherein the land based mobile feed tank and agitation tank are a single unit.

9. The method of claim 8, wherein the agitating occurs in the land based mobile feed tank.

10. The method of claim 7, wherein the additional material is moved to the grinder/mixer by a conveyor belt, and wherein the filtration equipment comprises a grizzly-type screen.

11. The method of claim 7, wherein the reclaimed soil comprises at least one material selected from a group consisting of topsoil, compost, and bedding soil.

12. The method of claim 7, wherein only the hydrated dredge spoils or only the hydrated dredge spoils and one or more chemicals may be pumped from the agitation tank to the dewatering system.

13. A system for processing dredge spoils, comprising:
    a feed system that receives dredge spoils, wherein the feed system comprises filtration equipment and a land based mobile feed tank, wherein the filtration equipment comprises a grizzly-type screen;
    a first pump for feeding the dredge spoils from the land based mobile feed tank to an agitation tank;
    a second pump for feeding the dredge spoils to a dewatering system from the agitation tank; wherein the dewatering system for removing water from the dredge spoils;
    a grinder/mixer for grinding the dredge spoils from the dewatering system while mixing the dredge spoils with one or more additional materials to give a reclaimed soil, wherein the one or more additional materials comprise sand and an organic material; and a solids conveyor for delivery of the reclaimed soil from the grinder/mixer.

14. The system of claim 13, wherein the land based mobile feed tank comprises a frac tank.

15. The system of claim 13, comprising a chemical treatment system that injects a chemical into the dredge spoils in the agitation tank.

16. The system of claim 13, wherein the dewatering system comprises at least three filter presses to remove water from the dredge spoils.

17. The system of claim 13, wherein the grinder/mixer comprises a pug mill.

18. The system of claim 13, comprising:
a bagging system to bag the reclaimed soil, wherein the solids conveyor transports the reclaimed soil to the bagging system.

19. The system of claim 13, wherein the reclaimed soil comprises topsoil, compost, and/or bedding soil.

20. The method of claim 1, wherein only the dredge spoils or only the dredge spoils and one or more chemicals may be pumped from the agitation tank to the dewatering system.

* * * * *

UNITED STATES PATENT AND TRADEMARK OFFICE
CERTIFICATE OF CORRECTION

PATENT NO. : 10,654,739 B2
APPLICATION NO. : 14/832591
DATED : May 19, 2020
INVENTOR(S) : Patrick D. Wade

Page 1 of 1

It is certified that error appears in the above-identified patent and that said Letters Patent is hereby corrected as shown below:

On the Title Page

Item [73], the Assignee's address "Richwood, TX" should read --Bellaire, TX--

Signed and Sealed this
Thirtieth Day of June, 2020

Andrei Iancu
*Director of the United States Patent and Trademark Office*